E. B. STIMPSON.
WASHER.
APPLICATION FILED AUG. 29, 1913. RENEWED NOV. 5, 1914.
1,143,091.
Patented June 15, 1915.
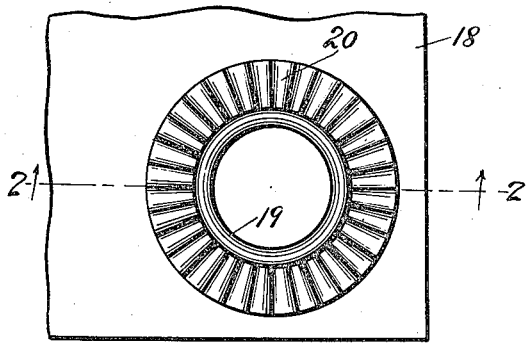
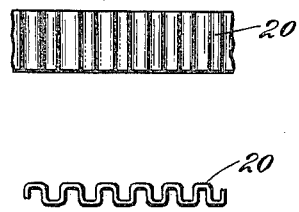
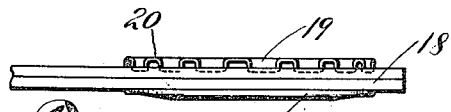
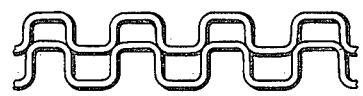
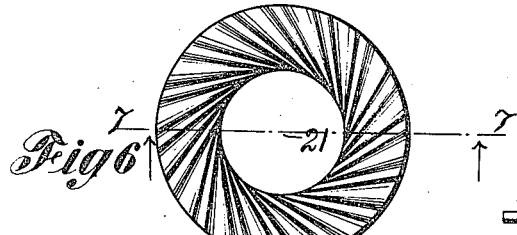
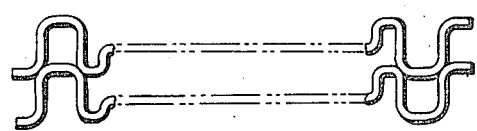
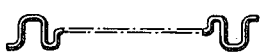
WITNESSES:
A. F. Harlow
A. M. Henry
INVENTOR
Edwin B. Stimpson
BY
Frank J. Kent
ATTORNEY

UNITED STATES PATENT OFFICE.

EDWIN BALL STIMPSON, OF BROOKLYN, NEW YORK, ASSIGNOR TO EDWIN B. STIMPSON COMPANY, OF BROOKLYN, NEW YORK.

WASHER.

1,143,091. Specification of Letters Patent. Patented June 15, 1915.

Application filed August 29, 1913, Serial No. 787,333. Renewed November 5, 1914. Serial No. 870,534.

*To all whom it may concern:*

Be it known that I, EDWIN B. STIMPSON, a citizen of the United States of America, and resident of Brooklyn, in the county of Kings and State of New York, have invented certain new and useful Improvements in Washers, of which the following is a specification.

This invention relates to washers constructed preferably of a pliable, flexible or conveniently conformable material, that is, a material which is non-resilient and inelastic, and so shaped that the edge-face portions of the washer are arranged to be disposed within planes removed from the plane of the central portion of the washer, and more particularly aims to provide a sheet-metal washer capacitated for utilization with an auxiliary member such as a gromet or rivet.

One of the objects of this invention is to provide a washer so conformed that a plurality of them may not become nested, one within another. This is preferably accomplished by arranging the conformations of the washer so that said conformations are partially established by a wall or section of material substantially at right angles to the general plane of the washer, or by otherwise constructing the said conformations so that a protuberance upon one washer can not be accommodated within a recess formed in the other; in other words, so that there can be no perfect face-to-face contact, with consequent adhesion, between two of the washers, whereby a plurality thereof will not, when stored within a hopper, become entangled in such manner as might prevent the ready selection or removal of a single one of the washers.

Still another object of the invention is to provide a washer for the purpose described, so generally conformed that the characteristic conformation of one face thereof will be the substantial duplicate of the characteristic conformation of the other face thereof, whereby the washer will be of a reversible nature.

A further object is to provide a sheet-metal washer for the purpose described, so conformed that although constructed from thin stock it will have an artificial effect of edge-thickness calculated to prevent it from riding or sliding over another when a plurality of said washers are automatically or otherwise deposited in any suitable feeding channel, guideway or track, as it has been the experience that most successful feeding of washers constructed from thin stock is accomplished when such washers have their said effect of thickness on their edges, or as near their edges as possible.

Still another object is to provide a washer for use with a gromet, rivet, or other auxiliary member, made of thin, readily deformable stock, having its outer edge-face portion defined between parallel planes separated by a distance considerably greater than the thickness of the washer material, the central portion of the washer, about the opening thereof, being spaced from both of said planes, and the washer material being of substantially uniform thickness throughout. There is thus provided a sheet metal washer, having an interrupted surface and having the effect of edge thickness, and the washer is dished on both sides centrally; the cavity thus formed on one side of the washer provides space between the washer and the opposed surface on which it is supported, for the end of the gromet, rivet or other member passing through the washer from the other side thereof; so that as the rivet or gromet is upset, the upset portions will all be, as they should, on the far side of the washer.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification, and in which I have shown various of the many possible embodiments of this invention: Figure 1 is a top plan view of an associated fabric, gromet and washer, the washer illustrating one of said embodiments; Fig. 2 is a transverse sectional view of the parts shown in Fig. 1, taken on the line 2—2 of Fig. 1, and looking in the direction of the adjacent arrows; Fig. 3 is a front elevation of said parts; Fig. 4 is a development in plan of the washer shown in Fig. 1, partially broken away; Fig. 5 is a front elevation of the development illustrated in Fig. 4; Fig. 6 is a top-plan view of another embodiment; Fig. 7 is a transverse sectional view of the embodiment shown in Fig. 6, taken on the line 7—7 of Fig. 6, and looking in the direction of the adjacent arrows; Fig. 8 shows in superposed relation two of the reversible washers illustrated in Figs. 4 and 5, with the projections of one of them opposite the corresponding depressed parts of another, showing how, by reason of the conformation of the projections and depressed parts, any face-to-face nesting engagement of the washers is impossible; and Fig. 9 is a view, similar to Fig. 8, but showing washers like those of Figs. 6 and 7.

Similar reference characters refer to similar parts throughout the several views of the drawings.

Referring now particularly to Figs. 1, 2 and 3 of the drawings, 18 represents a fabric or the like, 19 a gromet, and 20 a washer constituting a possible embodiment of this invention. Fig. 2 perhaps best shows the usual manner of assembly of gromet, fabric and washer, from which it will be clear that when the central neck of the gromet is upset as shown, the fabric is gripped between the washer and gromet as illustrated. Washer 20 is here provided with a plurality of radially arranged corrugations as disclosed, ranging toward the central opening thereof, and while these corrugations may each be of the same depth at the center edge as at the outside edge of the washer, it is preferred to taper them and gradually decrease their depth and width as they approach the center of the washer as illustrated. In any event, I prefer to make the conformations so that the central portion of the washer, about the opening thereof, is spaced from both of the planes that include the opposite edge-face portions. In other words, the washer is in effect identically centrally dished on both sides. It should be noted, most clearly from Fig. 3 (as well as from Fig. 5) that the side walls of these corrugations may be substantially perpendicular to the main plane of the washer. From this it follows, as shown in Fig. 8, that the projections of one washer cannot be entered into the corresponding depressions of a similar washer; therefore nesting of two washers is impossible. Of course, if the side walls of the corrugations were not perpendicular, the projections of one washer could enter the corresponding depressed parts of another washer, but preferably the conformations should be such that the entire opposed faces of the two washers could not be in contact.

Referring now particularly to Figs. 6 and 7, which is of the embodiments herein disclosed perhaps the most preferred, the washer is provided as shown with a plurality of corrugations each of which is generally similar to the corrugations formed in the embodiment disclosed in Figs. 1 to 5 inclusive, except in the respect that the corrugations of the embodiment shown in Figs. 6 and 7 are not arranged to radiate from the imaginary center 21 of the washer, but on the contrary, as disclosed, a prolongation of each corrugation away from the outside edge of the washer would materially clear said center 21. These corrugations may also be arranged in such manner that their side walls are substantially perpendicular to the general plane of the washer, for the reason explained in connection with the similar arrangement of the Fig. 4 structure; and in any event the conformations should preferably be such that the projections of one washer cannot be so completely entered into the depressed parts of another similar washer that the entire opposed surfaces of the two washers will be in contact.

In both structures which I have described, there is embodied a reversible washer made of thin stock, identically centrally dished on both sides, and having its edge portion, at least, provided on one side with a series of alternate projections and depressed parts, each such projection having its counterpart depressed part on the other side of the washer, each projection and depressed part having portions whereby when the projections of one washer are brought into registry with the depressed parts of a similar washer the washers will be held out of face-to-face contact, whereby nesting of one such washer within a similar washer is rendered impossible; and the fact that the washers have the effect of edge thickness makes it possible to feed them one after another down a slide without danger of overlapping and clogging.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

Having described my invention, what I claim as new, and desire to secure by Letters Patent, is:

1. A washer for the purpose described made of thin stock and having its edge portion provided with conformations each providing on one side of the washer a projection and on the other side a corresponding depressed part, each projection and depressed part having portions whereby when the projections of one washer are brought into registry with the depressed parts of a similar washer the washers will be held out of face-to-face contact, so that nesting of one such washer within a similar washer is rendered impossible.

2. A washer for the purpose described made of thin stock and having its edge portion defined by conformations each providing on one side of the washer a projection and on the other side a corresponding depressed part, each projection and depressed part having portions whereby when the projections of one washer are brought into registry with the depressed parts of a similar washer the washers will be held out of face-to-face contact, so that nesting of one such washer with a similar washer is rendered impossible.

3. A reversible washer for the purpose described made of thin stock and having its edge portion provided on one side with a series of alternate projections and depressed parts, each such projection having its counterpart depressed part on the other side of the washer, each projection and depressed part having portions whereby when the projections of one washer are brought into registry with the depressed parts of a similar washer the washers will be held out of face-to-face contact, whereby nesting of one such washer with a similar washer is rendered impossible.

4. A washer constructed of substantially inelastic and non-resilient material, having in its edge portion a plurality of corrugations, each of such corrugations being provided with a side wall substantially perpendicular to the general plane of the washer.

5. A washer having in its edge portion a plurality of radially arranged corrugations, each of such corrugations being provided with a side wall substantially perpendicular to the general plane of the washer and the depth of each corrugation decreasing gradually as it approaches the center of the washer.

6. A washer constructed of substantially inelastic and non-resilient material, including a plurality of corrugations, the prolongation of each corrugation from the outside edge of the washer passing outside the center of the washer, and each corrugation including a side wall substantially perpendicular to the main plane of the washer.

7. A washer for the purpose described made of thin readily deformable stock, having its outer edge defined between parallel planes separated by a distance greater than the thickness of the washer material, the central portion of the washer being spaced from both of said planes, and the washer material being of substantially uniform thickness throughout.

8. A reversible washer for the purpose described made of thin readily deformable stock, having its outer edge defined between parallel planes separated by a distance greater than the thickness of the washer material, the outer edge portion of the washer being identically symmetrically distorted on opposite sides, the central portion of the washer being spaced from both of said planes, and the washer material being of substantially uniform thickness throughout.

9. A washer for the purpose described made of thin readily deformable stock, having its outer edge defined between parallel planes separated by a distance greater than the thickness of the washer material, the washer material being of substantially uniform thickness throughout and having identical faces.

10. A washer for the purpose described made of thin readily deformable stock, and having its outer edge margin corrugated, forming an edge thicker than the thickness of the washer material and providing holding portions on each face, the entire over-all thickness of the washer being included within the planes between which the corrugated edges lie whereby the washer is reversible and either face thereof may be used to coöperate with a corresponding gromet.

In witness whereof, I have hereunto signed my name in the presence of two witnesses.

EDWIN BALL STIMPSON.

In the presence of—
Wm. J. Murphy,
William F. Kobilak.